United States Patent
Karusalmi et al.

(10) Patent No.: US 9,925,555 B2
(45) Date of Patent: Mar. 27, 2018

(54) FOLDED SEALING BLADE FOR A COATING APPLICATOR

(71) Applicants: Arto Karusalmi, Korpilahti (FI); Vesa Lamberg, Jyväskylä (FI)

(72) Inventors: Arto Karusalmi, Korpilahti (FI); Vesa Lamberg, Jyväskylä (FI)

(73) Assignee: VALMET TECHNOLOGIES, INC., Espoo (FI)

( * ) Notice: Subject to any disclaimer, the term of this patent is extended or adjusted under 35 U.S.C. 154(b) by 98 days.

(21) Appl. No.: 15/018,841

(22) Filed: Feb. 8, 2016

(65) Prior Publication Data

US 2017/0225187 A1   Aug. 10, 2017

(51) Int. Cl.
| | |
|---|---|
| *B05C 11/04* | (2006.01) |
| *F16J 15/3252* | (2016.01) |
| *F16J 15/3284* | (2016.01) |
| *D21H 23/36* | (2006.01) |

(52) U.S. Cl.
CPC ........... *B05C 11/045* (2013.01); *D21H 23/36* (2013.01); *F16J 15/3252* (2013.01); *F16J 15/3284* (2013.01); *B05C 11/041* (2013.01); *B05C 11/048* (2013.01)

(58) Field of Classification Search
CPC ............................. B05C 11/048; D21H 23/34
See application file for complete search history.

(56) References Cited

U.S. PATENT DOCUMENTS

| | | | | |
|---|---|---|---|---|
| 3,759,220 A | * | 9/1973 | Saito | G03G 15/751 |
| | | | | 101/157 |
| 4,141,313 A | * | 2/1979 | Hefele | A41D 27/06 |
| | | | | 118/212 |
| 4,354,449 A | * | 10/1982 | Zink | B05C 1/0834 |
| | | | | 101/169 |
| 4,839,201 A | | 6/1989 | Ratanen et al. | |
| 5,081,951 A | * | 1/1992 | Most | B05C 11/042 |
| | | | | 118/126 |
| 5,376,177 A | * | 12/1994 | Elvidge | B05C 3/18 |
| | | | | 118/410 |
| 5,783,042 A | * | 7/1998 | Leeman | D21G 3/005 |
| | | | | 15/256.51 |
| 5,885,350 A | | 3/1999 | Henninger | |

(Continued)

FOREIGN PATENT DOCUMENTS

| | | |
|---|---|---|
| DE | 3446525 A1 | 8/1985 |
| DE | 29617230 U1 | 1/1997 |

(Continued)

OTHER PUBLICATIONS

AALCO "Stainless Steel 1.4301 Bar and Section" Jan. 11, 2016, p. 1, http://www.aalco.co.uk/datasheets/Stainless-Steel-14301-Bar-and-Section_34.ashx.*

(Continued)

*Primary Examiner* — Karl Kurple
(74) *Attorney, Agent, or Firm* — Stiennon & Stiennon (57) ABSTRACT

A sealing blade includes opposite elongated edges (30, 31) and between them a flat (32) and which is adaptable to a blade holder (17) arranged in a coating applicator (25) of a coating device (21) and into contact with a moving surface (11'). The sealing blade has a contact surface (33), which may be arranged against the moving surface and which is 5-15% of the width (W) of the sealing blade (10).

11 Claims, 6 Drawing Sheets

(56) References Cited

U.S. PATENT DOCUMENTS

| | | | |
|---|---|---|---|
| 5,902,401 A | 5/1999 | Elvidge et al. | |
| 6,024,797 A | 2/2000 | Li et al. | |
| 6,152,069 A * | 11/2000 | Li | B05C 3/18 |
| | | | 118/410 |
| 6,203,615 B1 * | 3/2001 | Munch | B05C 11/042 |
| | | | 118/119 |
| 6,468,588 B1 * | 10/2002 | Bernert | B05C 11/025 |
| | | | 118/206 |
| 6,546,861 B2 * | 4/2003 | Manser | B41F 9/1072 |
| | | | 101/157 |
| 6,579,368 B1 | 6/2003 | Kohl et al. | |
| 7,108,766 B1 * | 9/2006 | Eskelinen | D21G 3/005 |
| | | | 162/111 |
| 9,088,043 B2 * | 7/2015 | Moon | B05C 1/0817 |
| 2003/0154870 A1 * | 8/2003 | De Volder | B41F 17/001 |
| | | | 101/170 |
| 2009/0151579 A1 * | 6/2009 | Sumiyoshi | B41F 9/1045 |
| | | | 101/169 |
| 2011/0189378 A1 * | 8/2011 | Moon | B05C 1/0817 |
| | | | 427/9 |

FOREIGN PATENT DOCUMENTS

| | | |
|---|---|---|
| EP | 1733802 A1 | 12/2006 |
| FI | 98545 A | 9/1993 |
| FI | 103058 A | 3/1999 |
| JP | S6197067 A | 5/1986 |
| WO | 2004070113 A1 | 8/2004 |

OTHER PUBLICATIONS

European Search Report for EP15194249 dated Apr. 13, 2016.
Finnish Search Report for FI20146006 dated Jun. 18, 2015.

* cited by examiner

FOLDED SEALING BLADE FOR A COATING APPLICATOR

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to a sealing blade, which includes opposite elongated edges and between them a flat and which is mountable to a blade holder arranged in a coating applicator of a coating device, where the sealing blade is brought into contact with a moving surface.

The coating or surface sizing of paper or board may be performed for example using a film transfer coater. In it, the web to be treated runs through a nip located between two rolls. The coating mixture or sizing agent is spread using a specific coating applicator onto the surface of one roll or both rolls, from which surface it is transferred onto the surface of the web to be treated in the nip between the rolls. The thickness and profile of the sizing agent layer on the surface of the roll may be adjusted for example by means of a doctor blade or a rotating metering rod.

The coating applicator may comprise an application chamber, which is limited in the direction of rotation of the roll by a doctor element and on the other hand by a front wall. In the lateral direction, the application chamber is limited by side seals. The coating mixture or surface sizing agent is fed into the application chamber for example through a channel located in a girder of the coating applicator. The coating mixture is fed into the application chamber at such a great speed and pressure that a return flow is created in the gap between the front wall and the application roll, in other words a coating mixture flow or sizing agent flow in a direction opposite to the direction of rotation of the application roll is created. The purpose of the return flow is to prevent the penetration of air, which is on the surface of the application roll, into the application chamber. If air can enter the application chamber, places with no coating may be created in the web.

It is well known that a sealing blade may be used as the front wall that closes the application chamber. The sealing blade may be pressed against the application roll so that no air escapes from between the blade and the application roll into the application chamber. There is no actual return flow from between the sealing blade and the application roll, but some coating mixture is led from the application chamber to the front of the blade through flow openings in the sealing blade. In this case, a pool of lubricant is formed in front of the sealing blade, which pool of lubricant prevents the friction occurring between the sealing blade and the application roll from damaging the roll or the sealing blade. If the pressure of the application chamber rises for example as a result of an excessive feeding of coating mixture, the force that presses the sealing blade against the application roll increases, whereby the sealing blade wears more rapidly and may damage the application roll or at least wear it.

However, a drawback related to the prior art sealing blade is that the edge of the blade placed against the application roll becomes sharp in connection with the use of the blade. This causes occupational safety problems in the maintenance of the coating applicator. A sharpened sealing blade is dangerous to the maintenance personnel for example when the sealing blade, metering rod or the cradle of the metering rod is replaced. For the replacement of just the metering rod and its cradle, which replacement needs to be performed in some cases more frequently than the replacement of the sealing blade, it is not often customary to remove the sealing blade from the coating applicator, because this is troublesome to perform. What makes the removal of the sealing blade difficult is that it may be firmly stuck to its blade holder and would therefore require washing to facilitate the removal. A sealing blade which has become sharpened and which is also difficult to remove may cause incised wounds to employees and also damage to the surface of the application roll.

Attempts in many different ways have been made to solve the problem related to the sealing blade becoming sharpened, but with little success. Since the holder of the sealing blade is fastened to the girder in a stationary manner, it is difficult to change the position of the holder. The sealing blade may also be lifted higher in the blade holder, but this does not always give the desired outcome, either. An attempt to enhance the lubrication that decreases the friction between the sealing blade and the application roll may be made by changing the feed pressure, but this is restricted by the seals that do not seal sufficiently well and by fouling problems. Moreover, it is not desirable to shift to a thinner sealing blade and a higher chamber pressure because of reasons such as increased leaks and splashes.

One prior art sealing blade that can be mentioned is in FI patent number 103058. The sealing blade known from it is a planar item. Both flat surfaces of the blade are hence essentially similar planar surfaces, in other words the front edge and the back edge of the blade are in the same plane.

SUMMARY OF THE INVENTION

The purpose of the present invention is to accomplish a sealing blade where the edge becomes less sharpened. The characteristic of the sealing blade are a contact surface which may be arranged against a moving surface and which is 5-15% of the width (W) of the sealing blade and is part of the sealing blade.

In the invention, a contact surface, which may be arranged against a moving surface and which is 5-15% of the width of the sealing blade, is adapted in the sealing blade. As a result of the contact surface already adapted in the sealing blade in advance, the angle between the sealing blade and the moving surface decreases, the area of contact of the sealing blade with the moving surface increases, and the wear of the sealing blade decreases. In this way, also the flat surface of the sealing blade can be brought reliably into contact with the moving surface, the sharpening of the elongated edge of the sealing blade is reduced, and occupational safety related to the maintenance of the coating device is enhanced.

According to one embodiment, flow openings may be included in the flat of the sealing blade. In this case, most of the contact surface is adapted between the elongated edge and the flow openings. This ensures the optimum functioning of the flow openings in all circumstances, and they do not settle against the moving surface.

It is possible that the flat of the sealing blade is divided into two or more areas, and the contact surface is formed in at least one area. The division may be accomplished in different ways. Examples include folds or roundings to be made in the flat of the sealing blade. Several other advantages are also accomplished with the invention, such as longer service life of sealing blades, longer replacement interval of rolls, smaller quality variation of paper and board and higher production volume of paper and board, when sealing blades do not need to be replaced prematurely. The other additional advantages to be achieved with the invention are disclosed in the description of the invention, and the characteristics are disclosed in the claims.

BRIEF DESCRIPTION OF THE DRAWINGS

The invention, which is not restricted to the embodiments presented below, is described in more detail by making reference to the drawings, in which.

DESCRIPTION OF THE PREFERRED EMBODIMENTS

Figure 1:
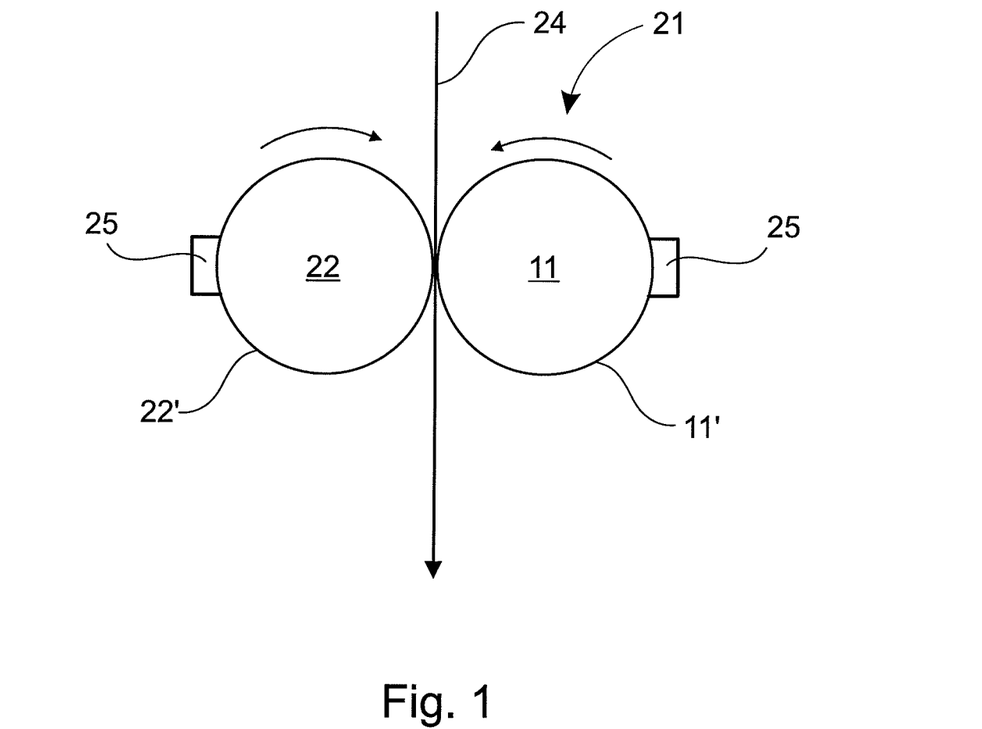
FIG. 1 shows an example in principle of a coating device viewed from the side.

FIG. 1 shows an example in principle of a coating device 21 viewed from the side. In this case, the device 21 comprises two rotating application rolls 22, 11, which are adapted in a nip contact and between which the paper or board web 24 to be treated, in other words to be surface sized or coated, is adapted to travel. The direction of travel of the web 24 is indicated by an arrow, and the direction of travel of each of the rolls 22, 11 is also indicated by an arrow. A web 24 treatment substance, such as a coating mixture or surface sizing agent, is spread onto the surfaces 22', 11' of the application rolls 22, 11 by means of coating applicators 25. The treatment substance layer is leveled and its thickness is adjusted by means of a doctor element such as a doctor blade or a rotating metering rod (reference number 15 in FIG. 2). The doctored treatment substance layer is transferred from the application rolls 22, 11 onto both sides of the web 24 to be treated in a nip between the rolls 22, 11. If only one side of the web 24 is treated, the treatment substance is only spread onto one application roll 11.

Figure 2:
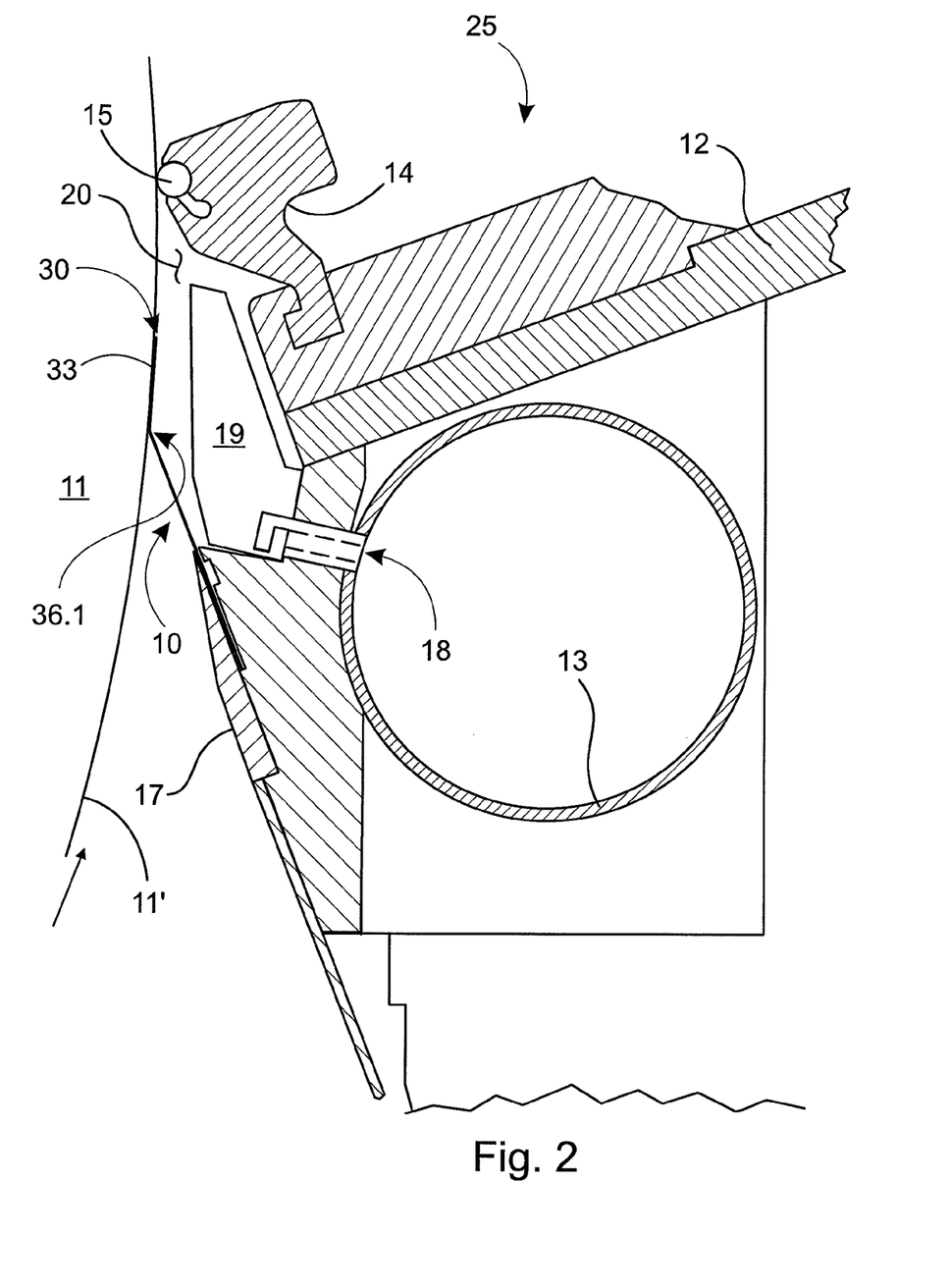
FIG. 2 shows one example of a coating applicator seen from the side.

FIG. 2 shows one example of a coating applicator 25 seen from the side. In this case, the coating applicator 25 is constructed to rest on the girder 12, and the application chamber 20 that is against the application roll 11 is formed by a space in the girder 12, which space is limited first in the direction of rotation of the application roll 11 by a sealing blade 10 which comes first, i.e. on the inlet side, and by a metering rod 15 which is on the outlet side, i.e. latter in the direction of rotation. The sealing blade 10 is fastened to the girder 12 by means of a blade holder 17, and the metering rod 15 is fastened by means of a rod holder 14.

The sealing blade 10 presses against the surface 11' of the application roll 11 and prevents, the coating from flowing in an uncontrolled manner against the direction of rotation of the roll 11 and prevents the access of air, which is carried with the rotating roll 11, into the application chamber 20. A metering rod 15 is placed at a distance from the sealing blade 10, which metering rod 15 is pressed against the application roll 11, but which metering rod 15 is suspended hydrodynamically at a distance from the surface 11' of the roll 11 by a film transferred onto the rotating roll 11. The thickness of the film transferred onto the surface 11' of the roll 11 is adjusted by changing the loading of the metering rod 15. The distance between the sealing blade 10 and the metering rod 15 forms an application distance, and the application chamber 20 is hence limited by the girder 12, sealing blade 10, metering rod 15 and application roll 11. The ends of the application chamber 20 are sealed in the case according to the embodiment by means of flexible seals 19, which limit the width of the area to be coated. The coating is fed into the application chamber 20 through nozzles 18 from a main tube 13 located inside the girder 12 and extending over the entire width of the coating applicator 25.

Figure 3:
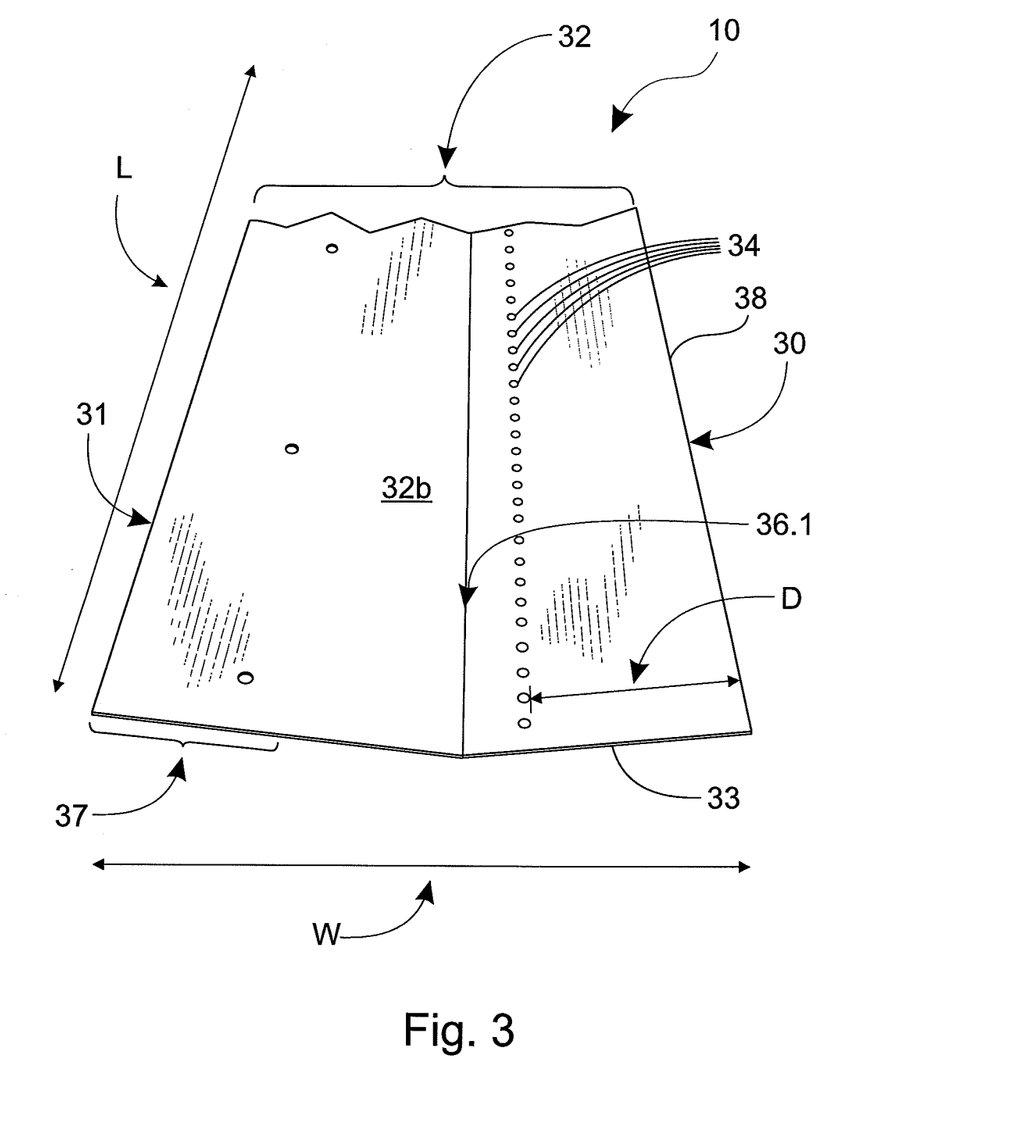
FIG. 3 shows one example of a sealing blade viewed axially from the top, from one end of the sealing blade.
Figure 4A:
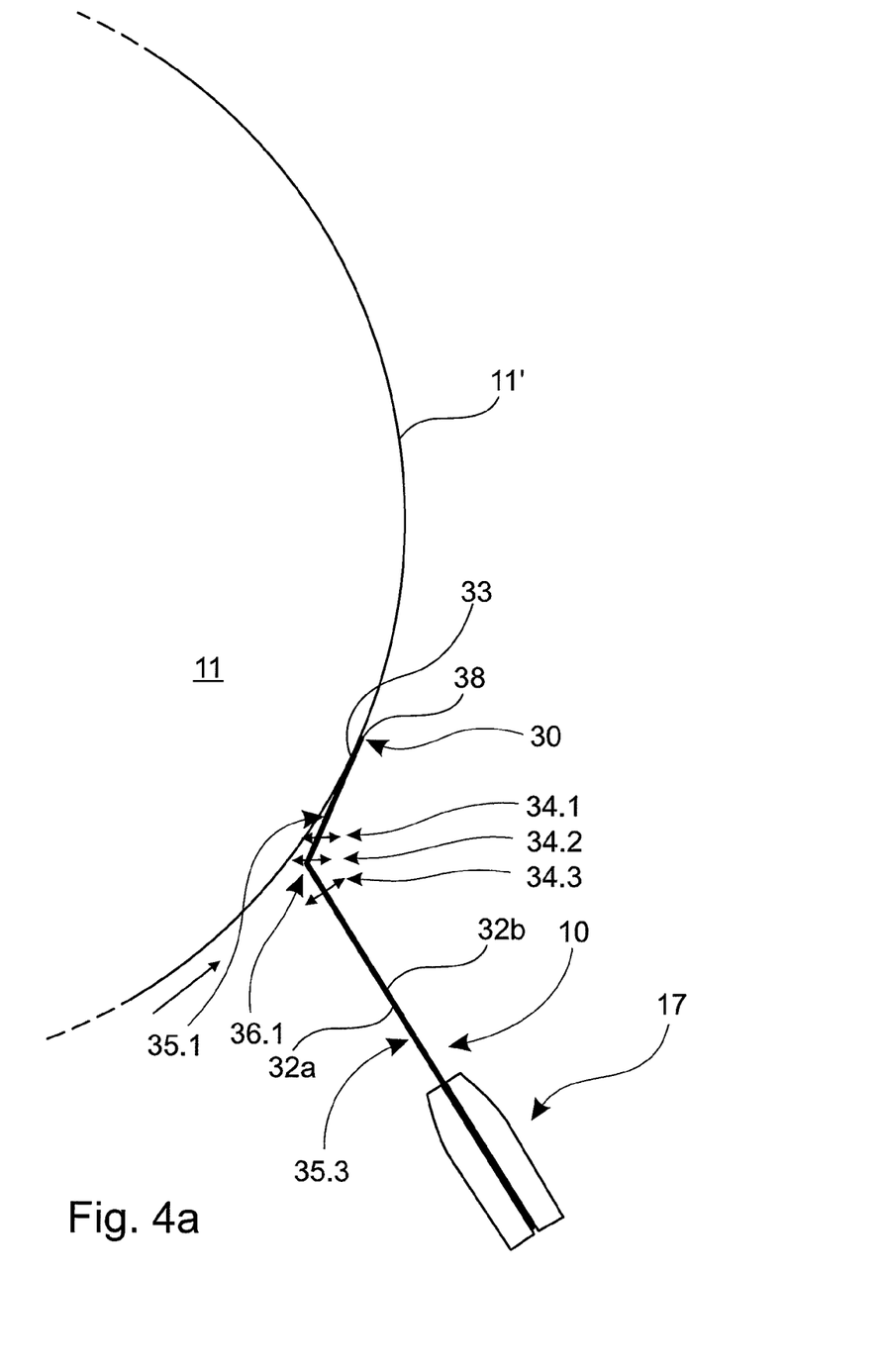
FIGS. 4a-4c show on a rough level of principle various embodiments of the sealing blade and of how it settles against the application roll, viewed from the side.
Figure 4B:
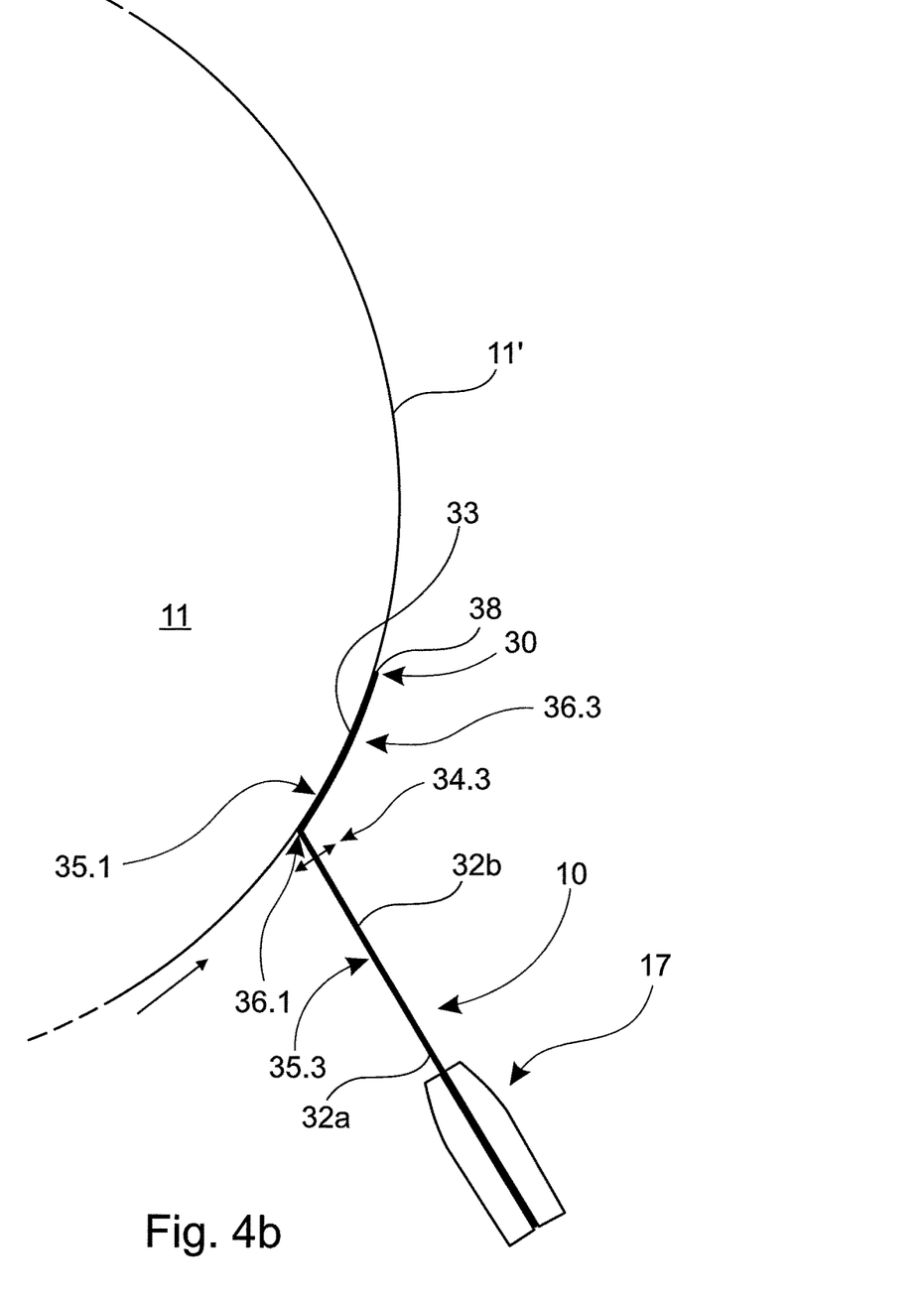
Figure 4C:
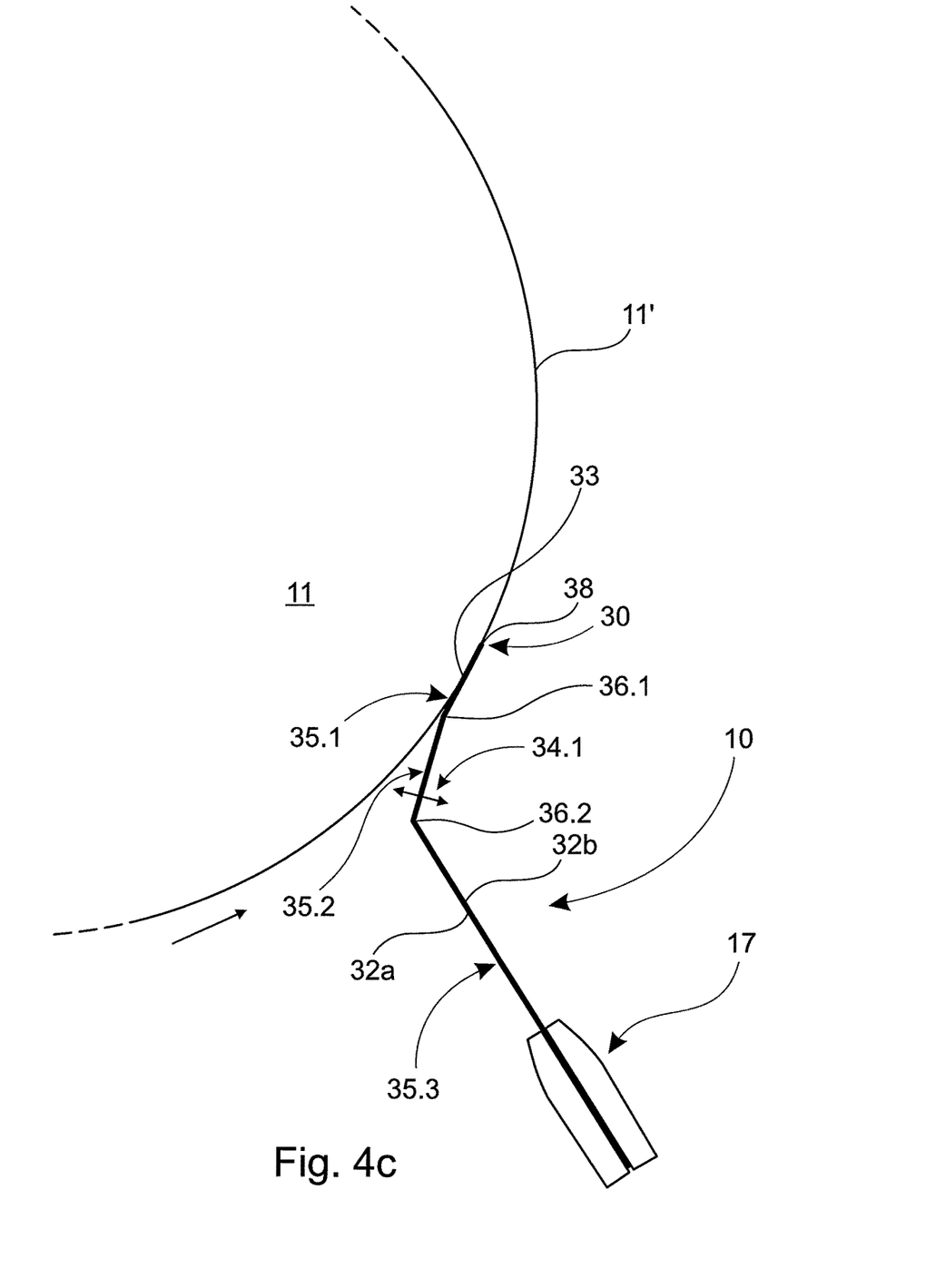

FIG. 3 presents one example of a sealing blade 10 viewed axially from the top, from its one end, which sealing blade 10 may be corresponding to the one installed in the coating applicator 25 in FIG. 2. The sealing blade 10 includes opposite elongated edges 30, 31 and a flat 32 between them. The flat 32 has two opposite sides, forming the flat surfaces 32a and 32b as shown in FIG. 4. The flat surface 32a of the flat 32 on the side of the roll 11 and the flat surface 32b on the side of the application chamber 20. Of these flat surfaces, FIG. 3 shows the flat surface 32b on the side of the application chamber 20.

The sealing blade 10 is arranged, so that it may be placed in a blade holder 17 arranged on a coating applicator 25 of a coating device 21 so that the blade contacts with the moving surface 11'. For mounting, the sealing blade 10 includes a fastening area 37 adjacent to first elongated edge 31, i.e., the back edge, from which fastening area 37 the sealing blade 10 is adapted to be fastened to the blade holder 17. In the fastening area 37, there may be for example die-cut fasteners holes 31b, which ensure the fastening of the blade 10 to the holder 17. The second elongated edge 30, i.e., the front edge, is opposite to this first edge 31 mounted in elongated holder 17. The front edge 30 includes a tip 38, which is arranged against the moving surface 11'.

A contact surface 33, best shown in FIG. 4, may be arranged against the moving surface 11', forms part of the sealing blade 10. Some examples of the contact surface 33 are presented in FIGS. 2 and 4a-4c. The contact surface 33 is on the flat surface 32a of the sealing blade 10 is on the side of the roll 11, in other words on a side opposite the side 32b forming part of the application chamber 20. The contact surface 33 may be 5-15% of the width W of the sealing blade 10. In this connection, the width W of the sealing blade, see FIG. 3, refers to the distance between the elongated edges 30, 31 of the sealing blade 10, measured along the flat 32. Correspondingly, the length L of the sealing blade 10 refers to the length of the sealing blade 10 in the cross direction of the machine. The length L of the sealing blade 10 may be several meters, and as much as ten meters. The directions W and L are perpendicular to each other. It must be noted that in the figures the proportions of the sealing blade 10 and its parts are not necessarily actual proportions. As a result of the contact surface 33 arranged in the sealing blade 10 as early as during its manufacture, the sealing blade 10 is, when installed in the blade holder 17, at a suitable angle with respect to the roll 11, and hence for example the lubrication of the tip 38 of the sealing blade 10 becomes sufficient and the tip 38 becomes less sharpened even without lubrication, because part of the flat surface 32a is against the moving surface 11' as opposed to the prior art where only the edge of the blade is in contact with the roll and so becomes sharp.

By arranging the contact surface 33 in the sealing blade 10, it can be brought into contact with the moving surface 11' more reliably over a larger area and especially over its flat 32, than merely by contacting the moving surface 11' along its elongated edge 30. Moreover, the contact surface 33 is in the sealing blade 10 already formed before it is installed in the blade holder 17, and it is not formed only when loading the blade 10 against the moving surface 11'. In other words, it can be said that initial tension has been removed from the blade 10 when it is installed in its blade holder 17. This makes the contact between the flat 32 of the blade 10 and the moving surface 11' very reliable, and at the same time the sharpening of the tip 38 of the blade 10 is reduced.

According to one embodiment, flow openings 34, 34.1-34.3 may be adapted in the flat 32 of the sealing blade 10. Some examples of their locations have been presented in FIGS. 4a-4c, where the openings are described in principle by the two-headed arrows running through the flat 32 of the blade 10. Most of the contact surface 33 may be between the elongated edge 30 and the flow openings 34, and 34.1-34.3 of the blade 10, as shown in FIGS. 3 and 4. The contact surface 33 and the flow openings 34, 34.1-34.3 are formed in the sealing blade 10 so that when in contact with the moving surface 11', the flow openings 34, 34.1-34.3 formed in the sealing blade 10 are at least partially separated from the moving surface 11'. In this case, the moving surface 11' does not block the flow openings 34, 34.1-34.3. This also ensures the functioning of the flow openings 34, 34.1-34.3 in all circumstances, in other words the access of air into the chamber 20 is prevented, the lubrication of the sealing blade 10 is ensured and the removal of overpressure from the chamber 20 is ensured. As a result of the invention, it is even possible to improve the impacts achieved with the flow opening 34, 34.1-34.3. The location of the flow openings 34, 34.1-34.3 on the flat 32 of the blade 10 may be optimized for example close to a standardized contact surface 33 and hence the lubrication between for example the blade 10 and the moving surface 11' may be intensified.

According to one embodiment, the contact surface 33 may be arranged in the sealing blade 10 for example so that the flat 32 of the sealing blade 10 is divided into two or more areas 35.1-35.3, of which the contact surface 33 is formed in at least one area 35.1, in other words on one side of the flat 32. In FIGS. 4a and 4b, the sealing blade 10 has been divided into two areas 35.1, 35.3, and the contact surface 33 is in the area 35.1. In FIG. 4a, the contact surface 33 is in a planar area 35.1, and in FIG. 4b the contact surface 33 is in a curved area 35.1. In FIG. 4b the contact surface 33 indicated by 35.1 is curved to conform to the roll surface 11'. Correspondingly, in FIG. 4c the sealing blade 10 has been divided into three areas 35.1-35.3, and the contact surface 33 is again in the area 35.1, which is a planar area here, too.

According to the embodiments presented in FIGS. 4a-4c, the areas 35.1-35.3 may be formed in several different ways. According to a first embodiment, the flat 32 of the sealing blade 10 is divided into two or more areas 35.1-35.3 by means of one or more folds 36.1, 36.2. In FIGS. 4a and 4b, the sealing blade 10 has one fold 36.1, and in FIG. 4c, the sealing blade 10 has two folds 36.1, 36.2. That is: a first fold 36.2 and a second fold 36.1 wherein the second fold is between the first fold and the elongated front edge 38. The first fold 36.2 and the second fold 36.1 divides the first blade surface into three areas. The first area 35.3 extending from the blade holder 17 to the first fold 36.2, the second area 35.2 between the first fold to the second fold 36.1, and a third area 35.1 extending from the second fold to the elongated front edge 38. As shown in FIG. 4c the third area 35.1 is tangent to the moving roll surface 11'. The fold 36.1, 36.2 may be a beveled sharp fold or also a rounded fold. With two folds 36.1, 36.2, the angles of the folds do not need to be that great. The flat 32 of the sealing blade 10 may also be divided into two or more areas 35.1, 35.3 by means of one or more rounded surfaces such as 36.3 shown in FIG. 4b. The folds 36.1, 36.2 and/or roundings 36.3, more generally the removal of the initial tension of the sealing blade 10, may be performed for example in the last stage of the manufacture of the sealing blade 10.

FIGS. 4a present three different possibilities to arrange the flow openings 34.1-34.3 in the sealing blade 10. They can be for example in the same area 35.1 with the contact surface 33, in which case they are between the fold 36.1 and the contact surface 33. They can also be in the same area 35.3 where the sealing blade 10 is fastened to the holder 17. Moreover, they can also be at exactly the fold 36.1. In the embodiment of FIG. 4b, the flow openings 34.3 are in the area 35.3, and in FIG. 4c the flow openings 34.1 are in the area 35.2.

The distance D of the top edge of the flow openings 34, in other words that of the edge closest to the tip 38 of the blade 10, from the elongated edge 30 of the sealing blade 10, which edge 30 is equipped with the tip 38, may be for example 15-50 mm. The sealing blade 10 may be for example of spring steel type 1.4301, and its material thickness may be for example 0.254-0.381 mm and total width W for example 100-130 mm.

As presented above, the sealing blade 10 according to the invention is no longer a planar item known from prior art. Instead, its front edge 30 is deviated from the planar surface. The deviation may be accomplished for example by means of one or more angle folds in the longitudinal L direction of the blade 10. The folds may be located in the width W direction of the blade 10 at a distance of 5-15% from the tip 38 of the blade 10, which tip 38 is an edge 30 opposite to the edge 31 on the side of the blade holder 17. Another alternative presented for example in FIG. 4b is to round the tip portion of the blade 10 in the area 33 in question to be curved in the same direction as the curvature of the roll surface 11'.

It is to be understood that the above description and the related FIGS. are only intended to illustrate the present invention. The invention is hence not only restricted to the above-presented embodiments or the embodiments defined in the claims, but several different variations and adaptations of the invention will also be obvious to a professional in the field, which variations and adaptations are possible within the inventive idea defined by the enclosed claims.

The invention claimed is:

1. A structure for sealing an upstream side of an application chamber of a coating applicator of a coating device in a paper or board coating applicator wherein the structure is arranged to directly engage a moving roll surface of an applicator roll; said moving roll surface defines a direction in which the moving roll surface of the applicator roll moves, so that a portion of the structure slides on the moving roll surface, the structure comprising:
   a metal sealing blade having a width defined between a back edge and a front edge which form opposite edges of the metal sealing blade, and between the back edge and the front edge, are two opposite blade sides which form: a first blade surface having portions which form a contact surface which directly engages the moving roll surface, and an opposed second blade surface having portions opposite the contact surface;
   at least one first fold formed in the metal sealing blade between the back edge and the front edge, said contact surface and said first fold are formed in the metal sealing blade before said metal sealing blade is installed in the blade holder such that initial tension has been removed from the metal sealing blade before being installed in the blade holder or before said metal sealing blade contacts the moving roll surface;

wherein the first fold formed in the metal sealing blade is arranged to reduce tension in the metal sealing blade such that sharpening of the front edge is reduced: wherein the first fold which divides the first blade surface into first a part terminating at the back edge and a second part terminating at the front edge; wherein the metal sealing blade has a fastening area adjacent the back edge;

said contact surface includes a surface area for arrangement in direct contact with the moving roll surface, said surface area for arrangement in direct contact with the moving roll surface is located between a tip of the metal sealing blade and said first fold of the metal sealing blade;

wherein the back edge is arranged, along with the fastening area, to be mounted to a blade holder in the coating applicator of the coating device; and wherein portions of the first blade surface second part form the contact surface so the contact surface extending from the front edge toward the first fold. wherein the contact surface is arranged to lie along the moving roll surface of the applicator roll so that at least a portion of the contact surface forms a seal with the moving roll surface and the metal sealing blade extends along the moving roll surface in the direction in which the roll surface moves: said contact surface includes a flat surface area or a curved surface arranged to directly contact with the moving roll surface: wherein the portions of the second blade surface opposite the contact surface form part of the application chamber.

2. The structure of claim 1 wherein the metal sealing blade is formed of a stainless spring steel.

3. The structure of claim 2 wherein the metal sealing blade is formed of type 1.4301 stainless spring steel having a thickness between 0.254-0.381 mm and the width being 100-130 mm.

4. The structure of claim 1 wherein the portion of the contact surface in contact with the moving roll surface is 5-15% of the width of the metal sealing blade.

5. The structure of claim 1 wherein portions of the metal sealing blade form flow openings through the metal sealing blade which pass through the contact surface; and wherein a majority of the contact surface is between the front edge and the flow openings.

6. The structure of claim 5 wherein the portions of the metal sealing blade forming flow openings through the metal sealing blade are arranged so that when the metal sealing blade is in contact with the moving roll surface the flow openings are at least partially separated from the moving roll surface.

7. The structure of claim 5 wherein the flow openings define a top edge toward the back edge, and the top edge of the flow openings define a distance from the front edge of the metal sealing blade which is 15-50 mm.

8. The structure of claim 1 wherein the metal sealing blade fastening area has portions of the metal sealing blade which define fastening holes through which fasteners may pass to mount the metal sealing blade to the blade holder.

9. The structure of claim 1 wherein the moving roll surface has a curvature and the first blade surface second part which terminates at the front edge is formed to the curvature of the moving roll surface.

10. The structure of claim 1 wherein the first blade surface second part which terminates at the front edge has a second fold between the first fold and the front edge which divides the first blade surface into two parts such that one of said parts which terminates at the front edge is tangent to the moving roll surface.

11. The structure of claim 1 wherein the first blade surface second part is formed so as to conform to the roll surface.

* * * * *